United States Patent
Teramura et al.

(10) Patent No.: US 8,185,253 B2
(45) Date of Patent: May 22, 2012

(54) ELECTRONIC CONTROL UNIT FOR USE IN A VEHICLE

(75) Inventors: Mikio Teramura, Okazaki (JP); Kokichi Shimizu, Kariya (JP); Motohiro Yasue, Chiryu (JP)

(73) Assignee: Denso Corporation, Kariya (JP)

( * ) Notice: Subject to any disclaimer, the term of this patent is extended or adjusted under 35 U.S.C. 154(b) by 737 days.

(21) Appl. No.: 12/358,469

(22) Filed: Jan. 23, 2009

(65) Prior Publication Data

US 2009/0187289 A1     Jul. 23, 2009

(30) Foreign Application Priority Data

Jan. 23, 2008   (JP) ................................ 2008-12687

(51) Int. Cl.
*B60R 16/023*   (2006.01)
(52) U.S. Cl. .......................................... 701/1; 717/170
(58) Field of Classification Search ................. 701/1
See application file for complete search history.

(56) References Cited

U.S. PATENT DOCUMENTS

| | | | |
|---|---|---|---|
| 5,826,211 A | 10/1998 | Kobayashi | |
| 6,604,194 B1 | 8/2003 | Nam | |
| 6,782,313 B1 | 8/2004 | Frech et al. | |
| 7,751,956 B2 * | 7/2010 | Groer et al. | 701/31.5 |
| 7,984,362 B2 * | 7/2011 | Golub et al. | 714/775 |
| 2003/0163664 A1 * | 8/2003 | Kanda | 711/202 |
| 2003/0188303 A1 | 10/2003 | Barman et al. | |
| 2004/0073901 A1 * | 4/2004 | Imamatsu | 717/170 |
| 2004/0088739 A1 * | 5/2004 | Shimoji et al. | 725/135 |
| 2006/0259207 A1 * | 11/2006 | Natsume | 701/1 |
| 2007/0212016 A1 | 9/2007 | Kurisu et al. | |
| 2007/0287439 A1 | 12/2007 | Weyl et al. | |
| 2008/0161993 A1 * | 7/2008 | Groer et al. | 701/33 |

FOREIGN PATENT DOCUMENTS

| | | |
|---|---|---|
| DE | 10 2005 058550 | 6/2007 |
| JP | 2004-310221 | 11/2004 |
| WO | WO 2006/063919 | 6/2006 |

OTHER PUBLICATIONS

Extended European Search Report dated Jun. 8, 2009, issued in corresponding European Application No. 09000376.5-2211.
ISO/TC 22/SC 3: "Road Vehicles—Diagnostics on Controller Area Networks (CAN), Part 2, Network layer services" Draft International Standard ISO/DIS, pp. i-35, Jan. 2003.
(OBD II) Title 13, California Code Regulations, Section 1968.2, Malfunction and Diagnostic System Requirements for 2004 and Subsequent Model-Year Passenger Cars, Light-Duty Trucks and Medium-Duty Vehicles and Engines, No Date, pp. i-iii and 1-138.

* cited by examiner

*Primary Examiner* — Shelley Chen
(74) *Attorney, Agent, or Firm* — Nixon & Vanderhye P.C.

(57) ABSTRACT

A first microcomputer in an ECU outputs a CID of the ECU in response to a request from a scan tool when the ECU has multiple microcomputers implemented therein. Each of the multiple microcomputers has an additive value stored therein for counting an update of the software. The additive values from the multiple microcomputers are added as a sum total of the ECU that is further added to a CID base value. The sum total of the ECU added to the CID base value is then output as the CID of the ECU from the first microcomputer to the scan tool. Therefore, information stored in the first microcomputer is not necessarily changed for outputting an updated CID (e.g., software product number information) from the ECU.

4 Claims, 6 Drawing Sheets

ELECTRONIC CONTROL UNIT FOR USE IN A VEHICLE

CROSS REFERENCE TO RELATED APPLICATION

The present application is based on and claims the benefit of priority of Japanese Patent Applications No. 2008-12687, filed on Jan. 23, 2008, the disclosure of which is incorporated herein by reference.

FIELD OF THE INVENTION

The present disclosure generally relates to an electronic control unit having multiple microcomputers included therein for use in a vehicle.

BACKGROUND INFORMATION

Conventionally, a vehicular electronic control unit, or ECU, has a function that outputs a software product number that represents an identity of software used in the ECU, in response to a certain request from an external scan tool that diagnoses and detects failure of the ECU.

For example, Japanese patent document 2003-256228 (also published as US patent document 2003/0163664) discloses that a microcomputer in an ECU responds to a certain command transmitted from an outside device by transmitting, to the outside device, software version information that represents a version of software executed in the microcomputer. The software version information in this disclosure may correspond to the above-mentioned software product number.

Further, the ECU having multiple microcomputers implemented therein is well-known as disclosed in Japanese patent document JP-A-2004-310221, for example.

The conventional ECU having multiple microcomputers stores, in each of the microcomputers, the software product number used in those microcomputers for the output in response to the inquiry from the scan tool. That is, the scan tool to ECU communication includes (1) an input that specifies one of the multiple microcomputers that outputs the software product number, and (2) an output, to the scan tool, of the software product number of the software used in the specified microcomputer.

In addition, there may be two patterns of communication between the scan tool and the microcomputers. That is, (a) each of the multiple microcomputers has communication with the scan tool, and (b) only a specific microcomputer has communication with the scan tool. In the pattern (a), all of the microcomputers specified in the request from the scan tool transmit, to the scan tool, respective software product numbers in response to the request, and, in the pattern (b), the specific microcomputer acquires the software product numbers from the respective microcomputers in response to the request from the scan tool, and then the acquired product numbers are transmitted from the specific microcomputer to the scan tool.

In the rule/regulation implemented by California Air Resources Board, vehicles after the model year of 2010 must have one and only one Calibration ID (CID: equivalent of the software product number described above) for each vehicle. That is, from the scan tool's view, the ECU can have only one CID, regardless of the number of the microcomputers included therein.

Therefore, in case there are multiple microcomputers in one ECU, one specific microcomputer must respond to the request from the scan tool.

Thus, the specific microcomputer must have all of the software product numbers used in respective microcomputers in the ECU.

However, the above configuration of the software product number storage scheme has a problem if the software in the microcomputer that is not in direct communication with the scan tool must be replaced/changed. That is, if two microcomputers A and B are implemented in one ECU, and only the microcomputer A is configured to have direct communication with the scan tool, the software product number stored in the microcomputer A must be updated in the course of software update only related to the microcomputer B. That is, even when the software in the microcomputer A is not updated/changed, the contents of the stored information regarding the software product numbers stored in the microcomputer A have to be updated/re-written.

SUMMARY OF THE INVENTION

In view of the above and other problems, the present disclosure provides an ECU having multiple microcomputers that prevents information update of a specific microcomputer that outputs to an external device software product number information on behalf of the other microcomputers in the same ECU.

In an aspect of the present disclosure, one of the multiple microcomputers in the ECU is configured to output the software product number to an external device upon receiving an output request from the external device. That is, one of the multiple microcomputers is configured to be serving as a communication port for outputting software product number information to the external device.

In each of the multiple microcomputers of the ECU, an additive value that is representative of the number of updates of software that is executed in each of the multiple microcomputers is stored. The additive value may actually be stored in a memory unit in an inside of each of the microcomputers, or in a memory unit that is disposed outside of each of the microcomputers.

Then, the specific microcomputer calculates a sum of the additive values stored in each of the multiple microcomputers including itself, and generates, as an output to the external device, an update value that is updated from a base value of the software product number according to a generation rule that proportionally associates the sum of the additive value in proportion to the update value. In this case, the base value of the software product number is stored in the memory inside or outside of the specific microcomputer.

When the electronic control unit described above increments, or changes, the current additive value stored in the microcomputer that has the update of the software executed therein to a greater value, the update value generated by the specific microcomputer, or the software product number information that is to be output to the external device from the specific microcomputer in response to the request from the external device, is also changed to a greater value in comparison to the latest pre-updated value.

Therefore, the software product number information output from the specific microcomputer in the ECU to the external device can be updated by updating the additive value stored in the microcomputer having the update of the software without changing the storage contents of the specific microcomputer, when the software is changed in the non-specific microcomputers (i.e., the microcomputers other than the specific microcomputer).

Further, in another aspect of the disclosure, priority information is utilized by the specific microcomputer as a clue for determining which one of the microcomputers should be chosen to output the software product number information. The priority information is stored in the internal memory or in other storage as additional information.

Therefore, by updating the priority information in addition to the product number information, the software product number information output from the specific microcomputer to the external device is appropriately selected as an updated product number information from the software-updated microcomputer, which has been changed to a greater value in comparison to the latest pre-updated value already having been output to the external device prior to the latest software update.

Therefore, the software product number information, which is output from the specific microcomputer in the ECU to the external device (e.g., to the scan tool), can be updated only by updating the product number information and the priority information respectively stored in the microcomputer having the software update without changing the storage contents of the specific microcomputer, when the software is changed in the non-specific microcomputers (i.e., the microcomputers other than the specific microcomputer).

Furthermore, in the above-described information update scheme, output product number generation information may be employed for an output of the software product number information. The output product number information is also updated according to a specific rule that reflects the software update in each of the multiple microcomputers. Therefore, by only updating the output product number generation information stored in each of the multiple microcomputers, the software product number information output from the specific microcomputer that serves as a gateway to the external device can be appropriately generated.

BRIEF DESCRIPTION OF THE DRAWINGS

Objects, features, and advantages of the present disclosure will become more apparent from the following detailed description made with reference to the accompanying drawings, in which.

DETAILED DESCRIPTION

First Embodiment

Figure 1:
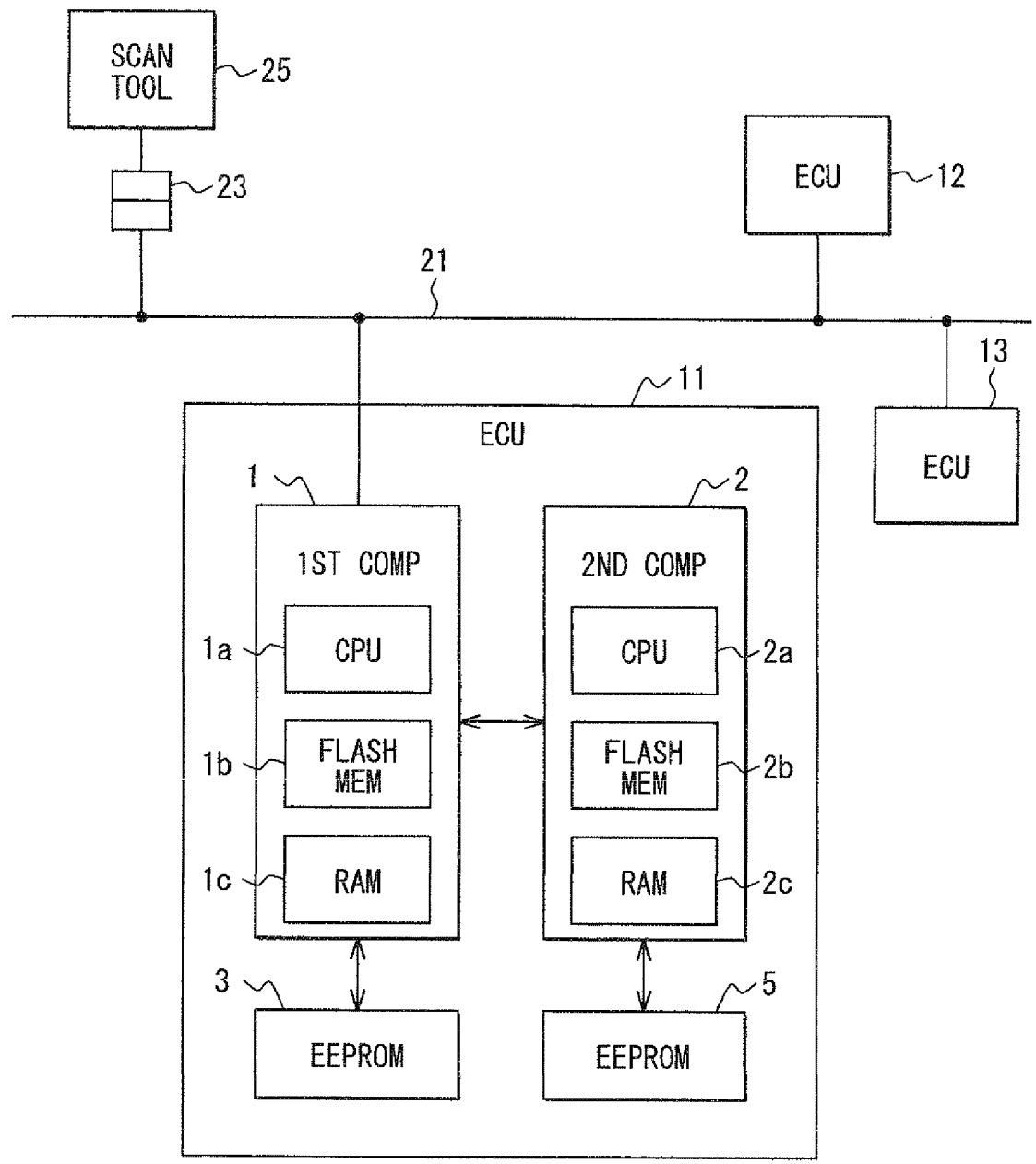
FIG. 1 is a block diagram of an electronic control unit in a first embodiment of the present disclosure.

In the following, the in-vehicle electronic control unit (ECU) of an embodiment which present invention was applied to is explained. In addition, for example, ECU in the present embodiment is ECU for controlling a power train such as an engine, a gearbox, and the like of the vehicle. An ECU 11 in the present embodiment is connected to other ECUs including ECUs 12, 13 through communication lines (for example, a CAN bus) in a vehicle 21 as shown in FIG. 1. And the ECU 11 uses the information acquired by communication with other ECUs including ECUs 12, 13, with the information from sensors connected thereto for controlling the engine and the gearbox of the vehicle.

In addition, a scan tool 25 (equivalent to an external device) as the fault diagnosis device is connected to the communication line 21 through a connector 23 that is disposed in an engine room or the like of the vehicle. By being connected to the communication line 21, the scan tool 25 can establish communication with each of the ECUs 11, 12, 13 which are respectively connected to the communication line 21.

In the ECU 11 of the present embodiment, a first microcomputer 1 carries out processing to mainly control the engine, and a second microcomputer 2 carries out processing to mainly control the gearbox. Both of the microcomputers 1, 2 can communicate with each other.

In addition, in the microcomputers 1, 2, there are CPUs 1a, 2a, flash memories 1b, 2b which are non-volatile and data-rewritable data storage for storing software (i.e., program data and control data for software execution and data reference), RAMs 1c, 2c that temporarily store a result of an arithmetic operation by CPUs 1a, 2a, and an I/O port (not illustrated), all of which are well-known elements for the person in the art. Further, data-rewritable non-volatile EEPROMs 3, 5 are connected to the microcomputers 1, 2 as an external memory.

In the ECU 11, the first microcomputer 1 communicates with other ECUs including ECUs 12, 13 and the scan tool 25 through the communication line 21. Therefore, the second microcomputer 2 exchange information with other ECUs including ECUs 12, 13 and the scan tool 25 via the first microcomputer 1. That is, for example, when a command to request the data which is held by the second microcomputer 2 is transmitted from the scan tool 25 to the ECU 11, the data is acquired from the second microcomputer 2 by the first microcomputer 1, and then the data will be transmitted from the first microcomputer 1 to the scan tool 25.

In addition, when a rewrite request for rewriting and/or updating software in the flash memory in either of the microcomputers 1 or 2 is transmitted from the scan tool 25 to the ECU 11, the software in the flash memory of the microcomputer that is indicated in the rewrite request is re-written by the new software that is transmitted from the scan tool 25.

For example, the software memorized in the flash memory 1b of the first microcomputer 1 is rewritten by the new software from the scan tool 25 by using a program for the software rewriting being carried out in the first microcomputer 1 when a rewrite request for the first microcomputer 1 is transmitted from the scan tool 25. In addition, when a rewrite request for the second microcomputer 2 is transmitted from the scan tool 25, the first microcomputer 1 performs a data transfer between the scan tool 25 and the second microcomputer 2, and the software memorized in the flash memory 2b of the second microcomputer 2 is, by using a program for the software rewriting being carried out in the second microcomputer 2, rewritten by the new software from the scan tool 25.

The first microcomputer 1 has the CID output capability which sends back CID (i.e., Calibration ID), to the scan tool 25, as software product number information representative of a product number of the software equipped in the ECU 11 when a CID output request from the scan tool 25 is received.

Figure 3A:
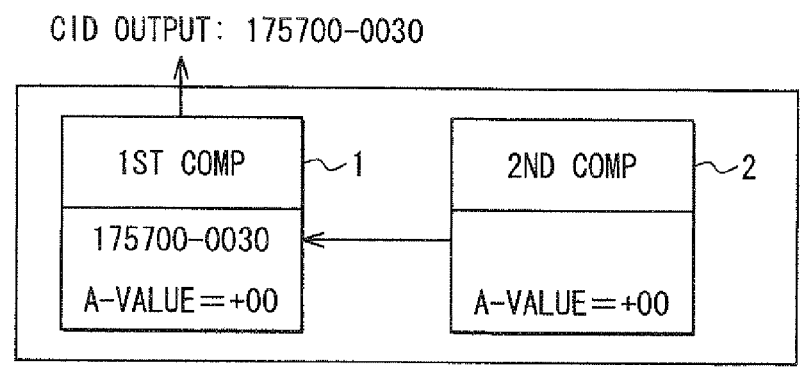
FIGS. 3A to 3D are illustrations of CID output conditions of the microcomputer in the first embodiment.

The CID output capability of the first microcomputer 1 is explained in the following. First, a base value (in the present embodiment "175700-0030"; designated as a CID base value hereinafter) of the CID is memorized in the first microcomputer 1 as shown in FIG. 3A. The base value is a value that will not be changed, and the CID base value is memorized in the flash memory 1b of the first microcomputer 1 in the present embodiment in advance.

In addition, an additive value that will be updated in response to software update in each of the microcomputers 1, 2 is memorized in respective microcomputers. The additive value is memorized in the flash memories 1a, 1b of the microcomputers 1, 2, and an initial value is defined as '0' ('00' in the present embodiment due to the requirement of two digits) for the additive value.

The additive value in each of the microcomputers 1, 2 is configured to be updated by the value of 1 (e.g., incremented) when the software of the microcomputer is updated.

More practically, as for the additive value of each of the microcomputers 1, 2, the additive value has the initial value '00' as shown in FIG. 3A at the time of production of the ECU 11.

Figure 3B:
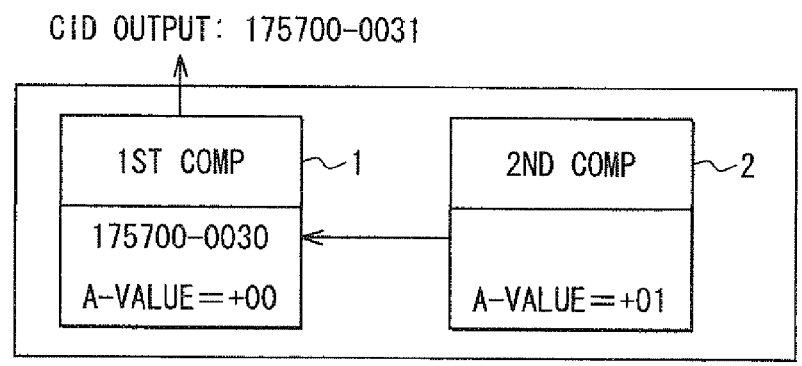

Then, the additive value of the second microcomputer 2 is updated from '00' to '01' as shown in FIG. 3B, if the software of the second microcomputer 2 is rewritten. In addition, the update of the additive value is performed at the time of rewriting of the software. In other words, the additive value is rewritten when the software is rewritten.

Figure 3C:
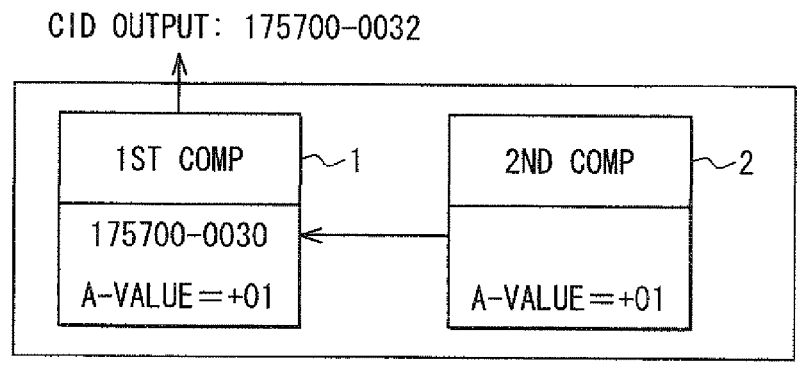
Figure 3D:
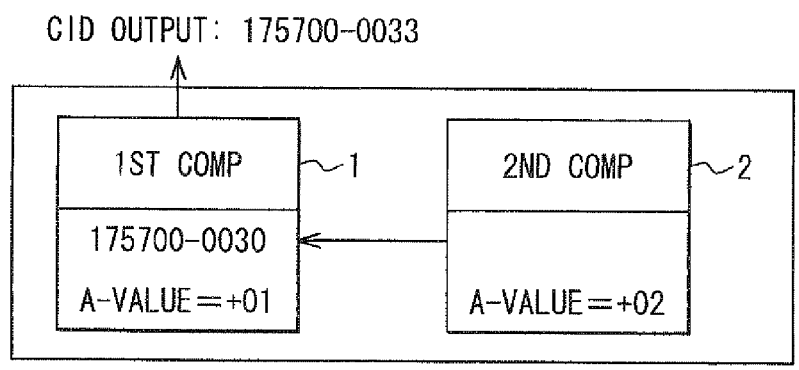

Then, the additive value of the first microcomputer 1 is updated from '00' to '01' as shown in FIG. 3C, if the software of the first microcomputer 1 is rewritten. The additive value of the second microcomputer 2 is updated from '01' to '02' as shown in FIG. 3D, if the software of the second microcomputer 2 is rewritten.

Figure 4A:
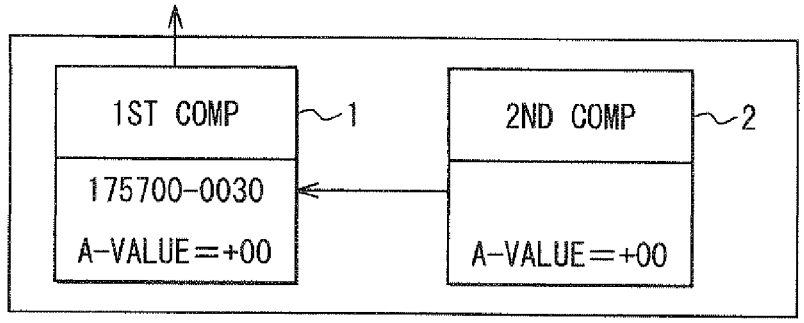
FIGS. 4A to 4D are other illustrations of CID output conditions of the microcomputer in the first embodiment.
Figure 4B:
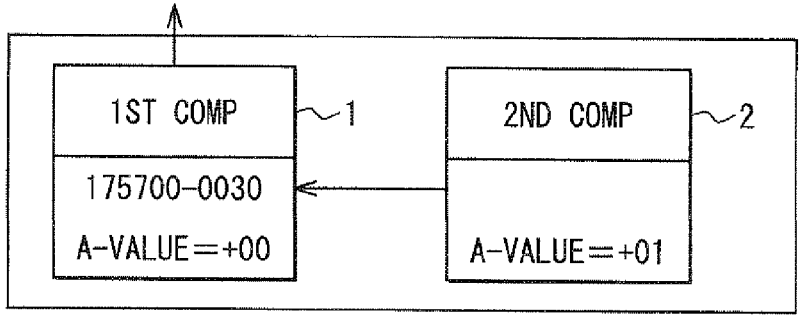
Figure 4C:
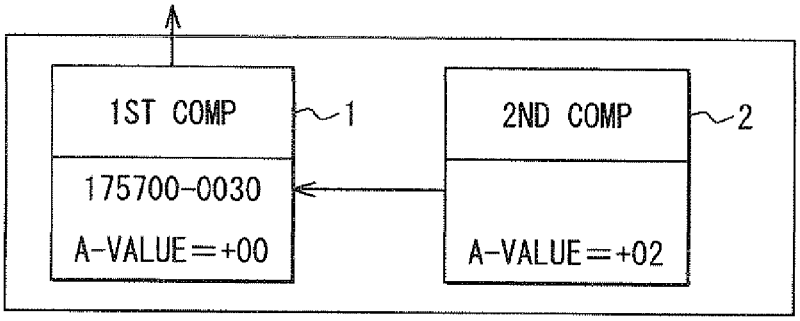
Figure 4D:
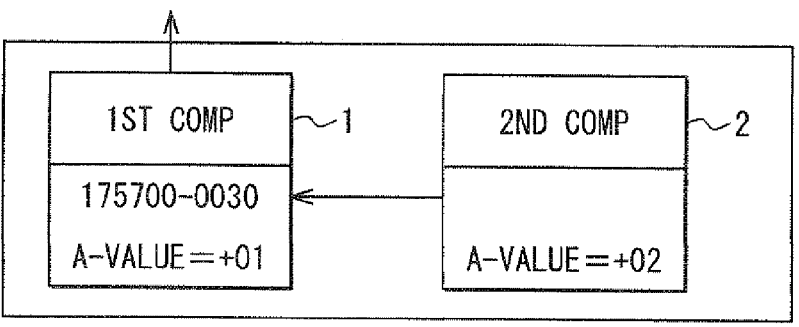

Further, the additive value of the second microcomputer 2 is updated from '01' to '02' as shown in FIG. 4C, if the software of the second microcomputer 2 is rewritten from a condition shown in FIG. 3B. Then, the additive value of the first microcomputer 1 is updated from '00' to '01' as shown in FIG. 4D, if the software of the first microcomputer 1 is rewritten. In addition, FIGS. 4A and 4B are same as FIGS. 3A and 3B.

As seen from the above, when the software of the microcomputers 1, 2 is updated in the present embodiment in the above-described way, the additive value memorized in the microcomputer that has the software update is changed to a greater value from the current value (i.e., the value of 1 is added to the current value in the present embodiment).

Figure 2:
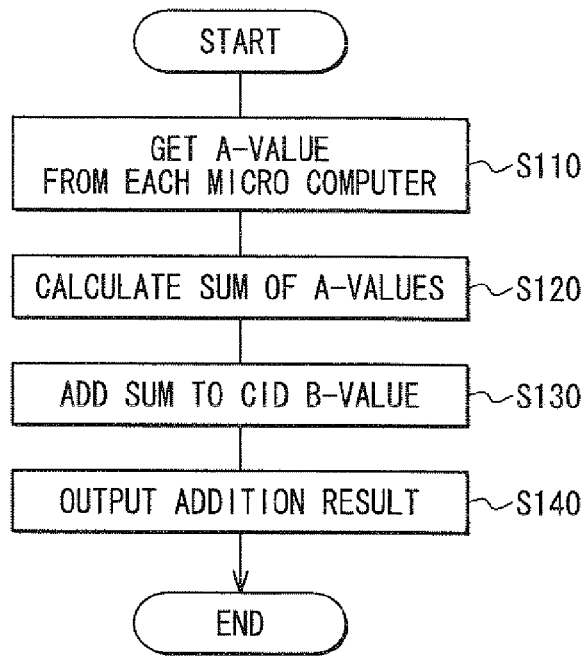
FIG. 2 is a flow chart of a process executed in a first microcomputer regarding a CID output in the first embodiment.

A CID output process shown in FIG. 2 is carried out by the first microcomputer 1 upon receiving the CID output request from the scan tool 25.

When the first microcomputer 1 starts to perform the CID output process shown in FIG. 2, the additive value (i.e., A-VALUE in the drawing such as FIG. 2) from each of the two microcomputers 1, 2 is acquired in S110 first. More practically, the additive value of the microcomputer 1 itself is read from the flash memory 1b thereof and the additive value of the second microcomputer 2 is acquired from the second microcomputer 2. In this case, the additive value of the microcomputer 2 is read from the flash memory 2b thereof and the additive value is then output to the first microcomputer 1 when and the first microcomputer 1 outputs a request of the additive value to the second microcomputer 2 and when the second microcomputer 2 receives the request. Further, the first microcomputer 1 may begin to read the additive value of the second microcomputer 2 from the flash memory 2b directly if the CPU 1a of the first microcomputer 1 is configured to be accessible to the flash memory 2b of the microcomputer 2 directly.

In S120, the sum total of the additive values of each of the two microcomputers 1, 2 is calculated next, and a value (i.e., an updated CID value hereinafter) that is derived by adding the sum total of the additive values from S120 to the CID base value (i.e., CID B-VALUE in the drawing such as FIG. 2) is calculated in S130. More practically, the sum total of the additive values are added to the lower 4 digits (0030) of the CID base value.

Then, in S140, the updated CID value calculated in S130 (i.e., a result of addition) is transmitted to the scan tool 25 as the CID of the ECU 11, and the CID output process concerned is finished afterwards.

The effects of the CID output process is explained next with reference to FIGS. 3 and 4.

First, the first microcomputer 1 transmits the value "175700-0030" (i.e., the CID base value) to the scan tool 25 as the CID of the ECU 11, when a CID output request is transmitted from the scan tool 25 to the ECU 11 on a condition that the software of the microcomputers 1, 2 has never been updated since the ECU 11 is produced as shown in FIG. 3A. This is because the grand total calculated by adding all the additive values of '0' in each of the two microcomputers 1, 2 is '00.'

After the update of the software in the second microcomputer 2, that is, when the additive value of the second microcomputer 2 has the value '01' as shown in FIG. 3B, the first microcomputer 1 transmits, to the scan tool 25, "175700-0031" that is derived from adding the sum total '01 (=00+01)' of the additive values of the two microcomputers 1, 2 to the CID base value as the CID of the ECU 11 if the CID output request is transmitted from the scan tool 25 to the ECU 11.

Further, after the update of the software in the first microcomputer 1, that is, when the additive values of both of the first and second microcomputers 1, 2 have the value '01' as shown in FIG. 3C, the first microcomputer 1 transmits, to the scan tool 25, "175700-0032" that is derived from adding the sum total '02' of the additive values of the two microcomputers 1, 2 to the CID base value as the CID of the ECU 11 if the CID output request is transmitted from the scan tool 25 to the ECU 11.

Furthermore, after the update of the software in the second microcomputer 2, that is, when the additive value of first microcomputer 1 has the value '01' and the additive value of the second microcomputer 2 has the value '02' as shown in FIG. 3D, the first microcomputer 1 transmits, to the scan tool 25, "175700-0033" that is derived from adding the sum total '03 (=01+02)' of the additive values of the two microcomputers 1, 2 to the CID base value as the CID of the ECU 11 if the CID output request is transmitted from the scan tool 25 to the ECU 11.

Also, after the update of the software in the second microcomputer 2 in a condition as shown in FIG. 3B, that is, when the additive value of the first microcomputer has the value '00' and the additive value of the second microcomputer 2 has the value '02' as shown in FIG. 4C, the first microcomputer 1 transmits, to the scan tool 25, "175700-0032" that is derived from adding the sum total '02 (=00+02)' of the additive values of the two microcomputers 1, 2 to the CID base value as the CID of the ECU 11 if the CID output request is transmitted from the scan tool 25 to the ECU 11. In other words, in the same manner as shown in FIG. 3C, the number of updates of the software in the entire ECU 11 is 2 in total, and the CID that is output to the scan tool 25 has the same value as the value already shown in FIG. 3C.

Further, after the update of the software in the first microcomputer 1, that is, when the additive value of the first microcomputer has the value '01' and the additive value of the second microcomputer 2 has the value '02' as shown in FIG. 4D, the first microcomputer 1 transmits, to the scan tool 25, "175700-0033" that is derived from adding the sum total '03 (=01+02)' of the additive values of the two microcomputers 1, 2 to the CID base value as the CID of the ECU 11 if the CID output request is transmitted from the scan tool 25 to the ECU 11. In other words, also in the same manner as shown in FIG. 3D, the number of updates of the software in the entire ECU 11 is 3 in total, and the CID that is output to the scan tool 25 has the same value as the value already shown in FIG. 3D.

Therefore, even if memory contents of the first microcomputer 1 are not changed, according to the ECU 11 of the present embodiment, the CID of the ECU 11 to be output to the scan tool 25 can have the updated value that reflects the number of software updates only by updating the additive value stored in the microcomputer having the software update when the software is updated in the microcomputer such as the second microcomputer 2 that is not equipped with the communication function, as the first microcomputer 1, for establishing communication with the scan tool 25.

In addition, in the present embodiment, the first microcomputer 1 is equivalent to a specific microcomputer. Further, the additive value memorized in each of the two microcomputers 1, 2 is equivalent to information for generating the software product-number information.

The modifications of the above embodiment may take the following forms. That is, the first microcomputer 1 may store the sum total of the additive values calculated in S120 of the FIG. 2 in the EEPROM 3. In that manner, for example, the current sum total and the previous sum total stored in the EEPROM 3 may be compared after the S120, and, if the current total is smaller than the previous total, abnormality of the current processing can be detected.

Also, in S130 of the FIG. 2, the first microcomputer 1 may multiply the sum total calculated in S120 by a certain number, and may add the multiplication product to the CID base value to calculate the updated CID value. By the above modification, the CID value to be output to the scan tool 25 will increase by the above-described certain number.

In addition, the additive values in the microcomputers 1 and 2 may be increased not only by the value of 1, but also by the value of other fixed number.

Further, at least one of the CID base value and the additive value in the first microcomputer 1 may be stored in the EEPROM 3. Likewise, in the second microcomputer 2, the additive value may be memorized in the EEPROM 5. In that manner, the memory capacity of the flash memories 1b, 2b can be saved in the microcomputers 1 and 2.

Second Embodiment

In the second embodiment, the ECU 11 has the same structure as the one in the first embodiment, thereby having like reference numbers.

When the ECU 11 of the second embodiment is compared with the first embodiment, the following points are different.

Each of the two microcomputers 1, 2 has the product number information (designated as CID candidate value hereinafter) that is used as the candidate of the CID of the ECU 11 concerned memorized therein. The product number information is updated in response to the software update in each of the microcomputers 1, 2 as shown in FIGS. 6A and 7A. The CID candidate value is rewritten together with the software in the flash memory in the present embodiment because the CID candidate value is stored in the flash memories 1b, 2b in the two microcomputers 1, 2. In addition, the initial value of the CID candidate value is 0 (i.e., '00' in the present embodiment due to the requirement of two digits). Further, in FIGS. 5, 6, 7, the CID candidate value is simply described as "CID".

Further, each of the two microcomputers 1, 2 has the line off time that serves as primary priority information and a priority level value that serves as secondary priority information memorized therein. In addition, in FIGS. 6 and 7, the line off time is denoted as "LO" in the drawing.

The line off time and the priority level value are stored as the priority information for determining which microcomputer's CID candidate value should be used as the CID value of the ECU 11, and are stored in the flash memories 1b, 2b of the microcomputers 1, 2 in the present embodiment. As for the line off time, it is rewritten together with the software in the flash memory. As for the priority level value, the smaller number indicates the higher priority. Further, in the present embodiment, the priority level values of the first and second microcomputers 1, 2 will not be changed from the initial values of 1 for the first microcomputer 1 and the initial value of 2 for the second microcomputer 2.

FIG. 6 and FIG. 7 are used to illustrate how the CID candidate values and the priority level values memorized in the two microcomputers 1, 2 are updated.

First, the CID candidate values of the two microcomputers 1, 2 have the value of '00' at the time of production of the ECU 11 as shown in FIG. 6A. Further, in this example, the line off (LO) time of both microcomputers is "2006/08" in each of the two microcomputers 1, 2. In addition, the figures ahead of the slash '/' represent the year in Christian calendar and the figures after the slash '/' represents the month.

Figure 6A:
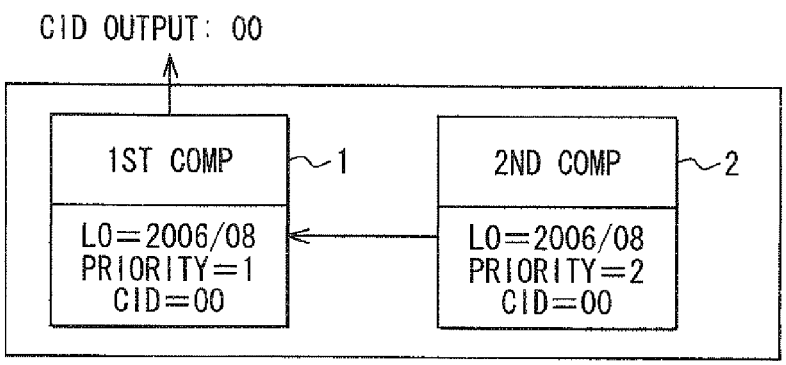
FIGS. 6A to 6D are illustrations of CID output conditions of the microcomputer in the second embodiment.
Figure 6B:
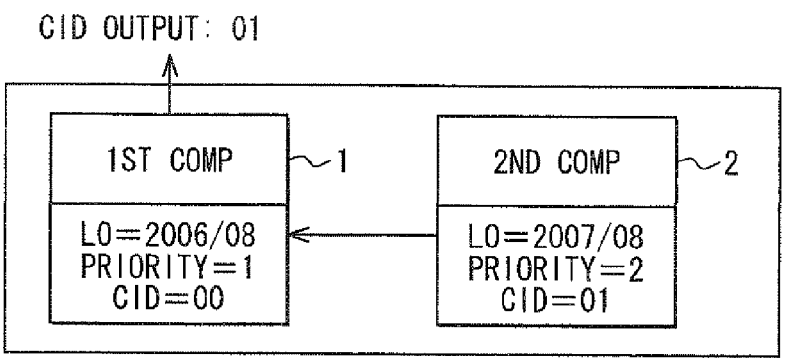
Figure 7A:
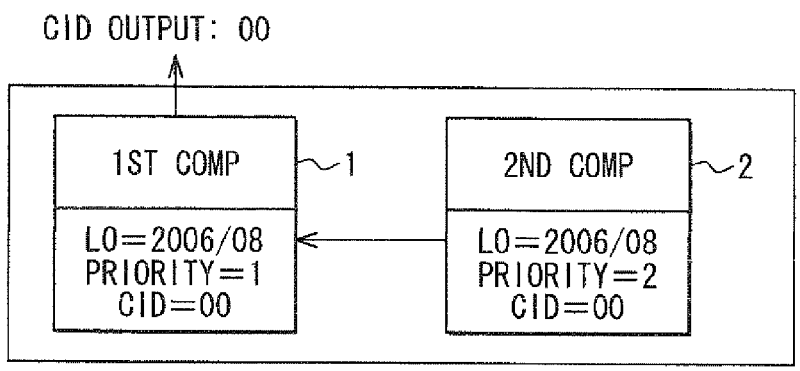
FIGS. 7A to 7D are other illustrations of CID output conditions of the microcomputer in the second embodiment.

Then, as shown in FIG. 6B, the value of the line off time of the second microcomputer 2 is changed to the value indicative of the start time of the usage of the software updated in the current change (i.e., "2007/08" in this case), which indicates a newer time than the line off time stored in the microcomputer 1, if the software of the second microcomputer 2 is rewritten. Further, the CID candidate value of the second microcomputer 2 is updated from '00' to '01.' The update rule of the CID candidate value is, in this case, "to change (i.e., to advance) the CID candidate value by adding '1' to the most advanced CID candidate value from among the values stored, prior to the software update, in the two microcomputers 1, 2."

In addition, the line off time and the update of the CID candidate value are performed at the time of rewriting of the software. In other words, the line off time and the CID candidate value are rewritten together with the software.

Figure 6C:
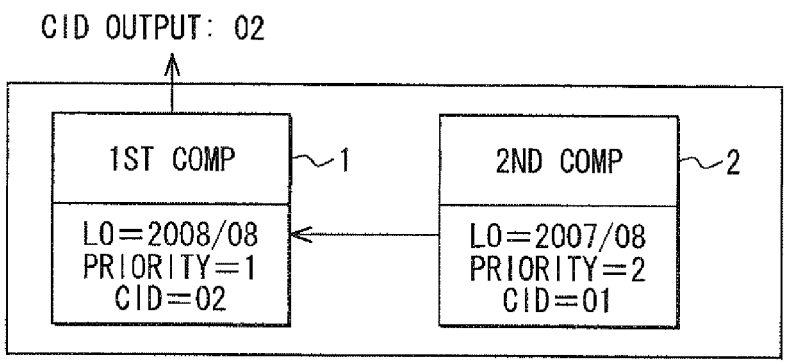

Then, as shown in FIG. 6C, the value of the line off time of the first microcomputer 1 is changed to the value indicative of the start time of the usage of the software updated in the current change (i.e., "2008/08" in this case), which indicates a newer time than the line off time stored in the microcomputer 2, if the software of the first microcomputer 1 is rewritten. Further, the CID candidate value of the first microcomputer 1 is changed to the advanced value of '02' that is advanced by 1 from the currently most advance value of '01' among all of the microcomputers 1, 2.

Figure 6D:
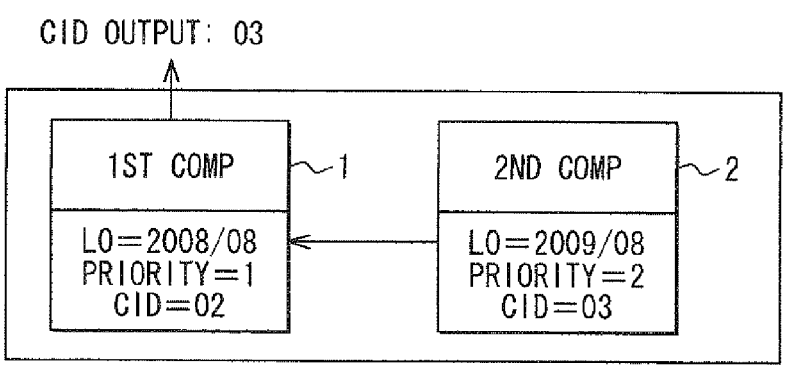

Then, as shown in FIG. 6D, the value of the line off time of the second microcomputer 2 is changed to the value indicative of the start time of the usage of the software updated in the current change (i.e., "2009/08" in this case), which indicates a newer time than the line off time stored in the microcomputer 1, if the software of the second microcomputer 2 is rewritten. Further, the CID candidate value of the second microcomputer 2 is changed to the advanced value of '03' that is advanced by 1 from the currently most advance value of '02' among all of the microcomputers 1, 2.

Figure 7B:
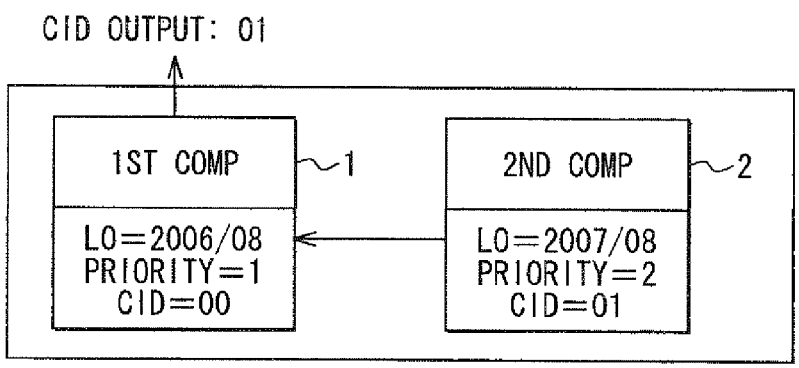
Figure 7C:
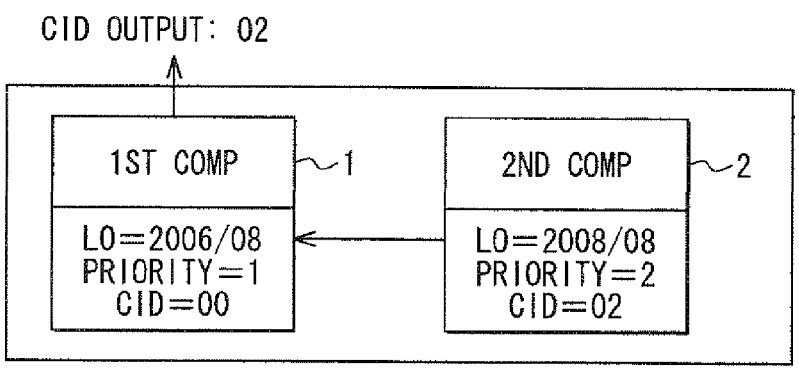

Further, for example, if the software of the second microcomputer 2 is rewritten in a condition shown in FIG. 6B, the value of the line off time of the second microcomputer 2 is changed to the value indicative of the start time of the usage of the software updated in the current change (i.e., "2008/08" in this case) as shown in FIG. 7C, which indicates a newer time than the line off time stored in the microcomputer 1. Further, the CID candidate value of the second microcomputer 2 is changed to the advanced value of '02' that is advanced by 1 from the currently most advance value of '01' among all of the microcomputers 1, 2.

Figure 7D:
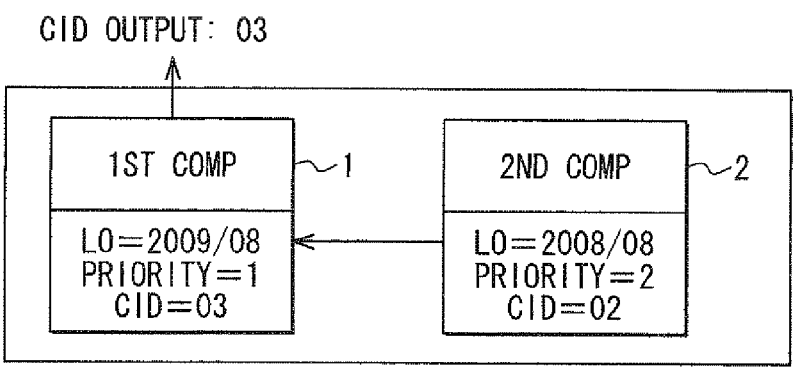

Then, as shown in FIG. 7D, the value of the line off time of the first microcomputer 1 is changed to the value indicative of the start time of the usage of the software updated in the current change (i.e., "2009/08" in this case), which indicates a newer time than the line off time stored in the microcomputer 2, if the software of the first microcomputer 1 is rewritten. Further, the CID candidate value of the first microcomputer 1 is changed to the advanced value of '03' that is advanced by 1 from the currently most advance value of '02' among all of the microcomputers 1, 2. In addition, FIGS. 7A and 7B are same as FIGS. 6A and 6B.

As seen from the above, when the software of the microcomputers 1, 2 is updated in the present embodiment in the above-described way, the line off time in the updated microcomputer is advanced to a newer value in comparison to the other microcomputers, and the CID candidate value in the updated microcomputer is advanced to a new advanced value relative to the current most advanced value among all of the microcomputers.

Figure 5:
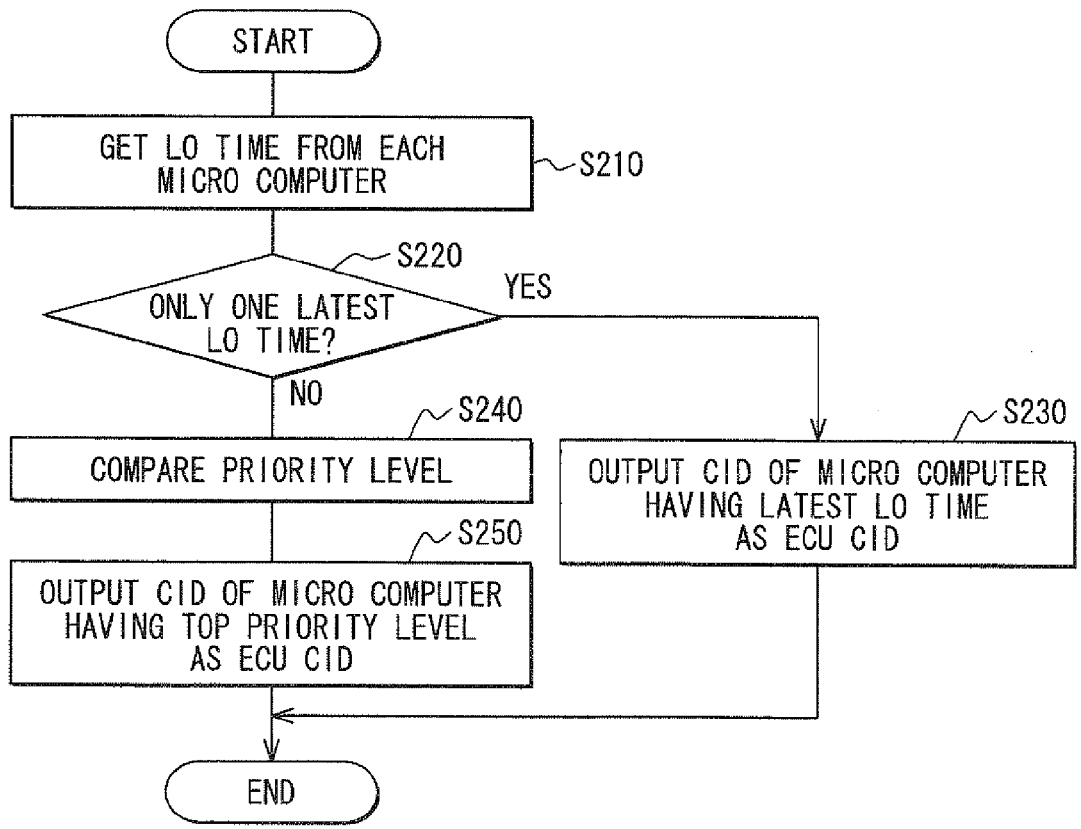
FIG. 5 is a flow chart of a process executed in the first microcomputer regarding a CID output in a second embodiment.

In the ECU 11 in the present embodiment, the first microcomputer 1 performs the CID output process shown in FIG. 5 in place of the CID output process in FIG. 2 upon receiving the CID output request from the scan tool 25.

When the first microcomputer 1 starts the execution of the CID output process shown in FIG. 5, at first, in S210, the line off times of each of the two microcomputers 1, 2 are acquired and compared for identifying one that indicates the latest time (i.e., the latest line off time). How to acquire the line off time from the microcomputers 1, 2 is already explained as the description of S110 in FIG. 2.

Then, in S220, it is determined whether there is only one latest line off time in the acquired line off times. If there is only one latest line off time, the process proceeds to S230.

In S230, the CID candidate value of the microcomputer which memorized the only one latest line off time is acquired. That is, if the first latest line off time is acquired from the first microcomputer 1, the CID candidate value is read from the flash memory 1b of the first microcomputer 1 itself, or if the only one latest line off time is from the second microcomputer 2, the CID candidate value is received from the second microcomputer 2 by sending a request to the second microcomputer 2. Further, in S230, the CID candidate value thus acquired is then transmitted to the scan tool 25 as the CID of the ECU 11. That is, the CID candidate value of the microcomputer which memorized the latest line off time is transmitted to the scan tool 25 as the CID of the ECU 11. Then, the CID output process is finished afterwards.

Alternatively, when it is determined that the latest line off time is not only one, that is, when it is determined that there are at least two latest line off times in the acquired line off times, the process proceeds to S240, and acquires the priority level values from the microcomputers that stores the latest line off time for determining the microcomputer having the highest priority level value by the comparison of the priority level values. In the present embodiment, the priority level values are acquired from the two microcomputers 1, 2 in S240 because the first microcomputer 1 and the second microcomputer 2 are included in the ECU 11. In addition, the process to acquire the priority level value of each of the two microcomputers 1, 2 is similar to the process for acquiring the additive values of each of the two microcomputers 1, 2 in S110 of FIG. 2 mentioned above.

Then, in S250, the CID candidate value of a microcomputer identified in S240 (i.e., the microcomputer having the highest priority level value) is acquired if the microcomputer identified in S240 is the first microcomputer 1, the CID candidate value is read from the flash memory 1b of the first microcomputer 1 itself, or if the microcomputer identified in S240 is the second microcomputer 2, the CID candidate value is received from the second microcomputer 2 by sending a request to the second microcomputer 2. Further, in S250, the CID candidate value thus acquired is then transmitted to the scan tool 25 as the CID of the ECU 11. That is, the CID candidate value of the microcomputer which memorized the highest priority level value is transmitted to the scan tool 25 as the CID of the ECU 11. Then, the CID output process is finished afterwards.

In other words, by the CID output process of the FIG. 5, the line off times memorized in each of the two microcomputers 1, 2 are compared, and the CID candidate value of the microcomputer which memorized the latest line off time is transmitted to the scan tool 25 as the CID of the ECU 11. However, if the line off times of each of the two microcomputers 1, 2 are same, the priority level values memorized in each of the two microcomputers 1, 2 are compared, and the CID candidate value of the microcomputer which memorized the highest priority level value is transmitted to the scan tool 25 as the CID of the ECU 11.

Further, in S210, and S230 to S250, required information may be acquired on demand piece by piece at required times, or may be acquired all at one time, for example, in S210. That is, the line off times, the priority level values and the CID candidate values of each of the two microcomputers 1, 2 may be acquired entirely at once for storage in a RAM 1c and for later use as required.

The effects of the CID output process is explained next with reference to FIGS. 6 and 7.

First, the priority level values of the two microcomputers 1, 2 are compared with each other due to the sameness of the line off times from the two microcomputers 1, 2 (i.e., "2006/08"), when a CID output request is transmitted from the scan tool 25 to the ECU 11 on a condition that the software of the two microcomputers 1, 2 has never been updated since the production of the ECU 11 as shown in FIG. 6A. Then, the CID candidate value '00' of the first microcomputer 1 itself is transmitted to the scan tool 25 as the CID of the ECU 11 by the first microcomputer 1, because the priority level value of the first microcomputer 1 is higher than that of the second microcomputer 2.

Then, after the update of the software in the second microcomputer 2 to be in a condition in FIG. 6B, the first microcomputer 1 transmits, to the scan tool 25, the CID candidate value '01' of the second microcomputer 2 as the CID of the ECU 11, if the CID output request is transmitted from the scan tool 25 to the ECU 11. This is because the line off time of the second microcomputer 2 is newer than that of the first microcomputer 1.

Then, after the update of the software in the first microcomputer 1 to be in a condition in FIG. 6C, the first microcomputer 1 transmits, to the scan tool 25, the CID candidate value '02' of the first microcomputer 1 itself as the CID of the ECU 11, if the CID output request is transmitted from the scan tool 25 to the ECU 11. This is because the line off time of the first microcomputer 1 is newer than that of the second microcomputer 2.

Further, after the update of the software in the second microcomputer 2 to be in a condition in FIG. 6D, the first microcomputer 1 transmits, to the scan tool 25, the CID candidate value '03' of the second microcomputer 2 as the CID of the ECU 11, if the CID output request is transmitted from the scan tool 25 to the ECU 11. This is because the line off time of the second microcomputer 2 is newer than that of the first microcomputer 1.

Also, after the update of the software in the second microcomputer 2 from a condition in FIG. 6B to a condition in FIG. 7C, the first microcomputer 1 transmits, to the scan tool 25, the CID candidate value '02' of the second microcomputer 2 as the CID of the ECU 11, if the CID output request is transmitted from the scan tool 25 to the ECU 11. This is because the line off time of the second microcomputer 2 is newer than that of the first microcomputer 1.

Further, after the update of the software in the first microcomputer 1 to be in a condition in FIG. 7D, the first microcomputer 1 transmits, to the scan tool 25, the CID candidate value '03' of the first microcomputer 1 itself as the CID of the ECU 11, if the CID output request is transmitted from the scan tool 25 to the ECU 11. This is because the line off time of the second microcomputer 2 is newer than that of the first microcomputer 1.

According to the ECU 11 of the present embodiment, the CID of the ECU 11 to be output to the scan tool 25 by the first microcomputer 1 is determined by selecting the CID candidate value of the microcomputer that recently has had the software update with the latest line off time stored therein. Further, the selected CID candidate value is configured to have the advance value relative to the CID value output to the scan tool 25 prior to the latest software update.

Therefore, even if memory contents of the first microcomputer 1 are not changed after the software update of the second microcomputer 2, according to the ECU 11 of the present embodiment, the CID of the ECU 11 to be output to the scan tool 25 can have the updated value only by updating the CID candidate value and the line off time stored in the microcomputers having the software update.

In addition, the line off times of each of the two microcomputers 1, 2 which the first microcomputer 1 acquires and compares in S210 of FIG. 5 may be stored in the EEPROM 3.

In that manner, for example, the first microcomputer 1 can detect abnormality of the transition of the line off times in the microcomputers 1, 2 by comparing the current line off times of the microcomputers 1, 2 with the previous line off times stored in the EEPROM 3 in the course of line off time comparison in S210 of FIG. 5. More practically, if the current line off time shows older date than the old line off time in a certain microcomputer, the abnormality of the update manner in the line off time and/or the memory abnormality can be detected.

Further, at least one of the CID candidate value, the line off time, and the priority level value may be stored in the EEPROMs 3, 4 that serves as external memories. In this manner, the memory capacity of the flash memories 1*b*, 2*b* can be saved in the microcomputers 1 and 2.

In addition, the line off time and the priority level information are used as the priority information, other information may also additionally be employed, or only the line off time may be used as the priority information. In the latter case, that is, when only the line off time is used as the priority information, the CID candidate value of a predetermined microcomputer (for example, the first microcomputer 1) may be configured to be output to the scan tool 25 upon determining that the microcomputer having the latest line off time is not only one in S220 in FIG. 5. For the flexibility of selection of the CID candidate value, having the priority level value with the line off time in the priority information may make it easier and more convenient for adjustably changing the selection/determination scheme of the CID of the ECU 11.

In addition, in the present embodiment, the CID candidate value and the line off time memorized in each of the two microcomputers 1, 2 are equivalent to the output product number generation information.

Although the present disclosure has been fully described in connection with preferred embodiment thereof with reference to the accompanying drawings, it is to be noted that various changes and modifications will become apparent to those skilled in the art.

For example, the number of the microcomputer included in the ECU 11 may be three or more in the above embodiment.

Such changes, modifications, and summarized scheme are to be understood as being within the scope of the present disclosure as defined by appended claims.

What is claimed is:

1. An electronic control apparatus having a plurality of microcomputers, the apparatus comprising:
    a first microcomputer among the plurality of the microcomputers for outputting, to an external device, software product-number information indicative of a product number of software that is used in the apparatus in response to an output request from the external device;
    a storage unit for storing an additive value in each of the plurality of microcomputers, wherein the additive value is updated when the software of each of the plurality of microcomputers is updated; and
    a calculation unit for calculating a sum of the additive values of the plurality of the microcomputers, for calculating an updated value for the software product-number information derived from an update of a base value of the software product-number information based on the sum of the additive values, and for outputting the updated value to the external device as the software product-number information, wherein difference between the updated value and the base value is in proportion to the sum of the additive values.

2. The electronic control apparatus of claim 1, wherein the first microcomputer calculates the updated value by adding the sum to the base values.

3. The electronic control apparatus of claim 1, wherein the first microcomputer stores the sum in a non-volatile memory area.

4. A method for updating the software product-number information in the electronic control apparatus of claim 1, the method comprising:
    changing the additive value to have a greater value relative to a current additive value in one of the plurality of microcomputers when the software of the one of the plurality of microcomputers is updated.

* * * * *